(12) United States Patent
Toyoda (10) Patent No.: US 10,284,006 B2
(45) Date of Patent: May 7, 2019

(54) UNINTERRUPTIBLE POWER SUPPLY SYSTEM

(75) Inventor: Masaru Toyoda, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 624 days.

(21) Appl. No.: 14/118,449

(22) PCT Filed: Jun. 9, 2011

(86) PCT No.: PCT/JP2011/063252
§ 371 (c)(1),
(2), (4) Date: Nov. 18, 2013

(87) PCT Pub. No.: WO2012/169046
PCT Pub. Date: Dec. 13, 2012

(65) Prior Publication Data
US 2014/0210271 A1    Jul. 31, 2014

(51) Int. Cl.
*H02J 3/46* (2006.01)
*H02J 9/06* (2006.01)
*H02M 7/493* (2007.01)

(52) U.S. Cl.
CPC .......... *H02J 9/061* (2013.01); *H02J 3/46* (2013.01); *H02J 9/062* (2013.01); *H02M 7/493* (2013.01); *Y02P 80/14* (2015.11); *Y10T 307/625* (2015.04)

(58) Field of Classification Search
CPC .. H02J 9/061; H02J 3/46; H02J 9/062; H02M 7/493; Y10T 307/625

(Continued)

(56) References Cited

U.S. PATENT DOCUMENTS 4,114,048 A * 9/1978 Hull ............... H02J 3/48
307/53
5,737,197 A * 4/1998 Krichtafovitch ....... B03C 3/68
363/17

(Continued)

FOREIGN PATENT DOCUMENTS

CN         1449087 A      10/2003
JP         50-150853      12/1975

(Continued)

OTHER PUBLICATIONS

Office Action dated Dec. 2, 2014 in Japanese Patent Application No. 2013-519311 (with English language translation).

(Continued)

*Primary Examiner* — Jared Fureman
*Assistant Examiner* — Emmanuel Dominique
(74) *Attorney, Agent, or Firm* — Oblon, McClelland, Maier & Neustadt, L.L.P.

(57) ABSTRACT

An uninterruptible power supply system, including: a plurality of uninterruptible power supply devices which are connected in parallel with respect to a load, and switch between power supplies supplying power to the load depending on states of the power supplies; a control unit controlling an operation of switching between the power supplies by the uninterruptible power supply devices; a storage battery connected to the plurality of uninterruptible power supply devices in common; a converter converting AC power; a contactor switching between the DC power converted by the converter and DC power input from the storage battery; and an inverter inverting the DC power and supplying the power to the load. The control unit deactivates the inverter which does not contribute to supplying a power amount required for the load, of a plurality of inverters.

7 Claims, 5 Drawing Sheets

(58) Field of Classification Search
USPC .......................................................... 307/65
See application file for complete search history.

(56) References Cited

U.S. PATENT DOCUMENTS

| | | | | |
|---|---|---|---|---|
| 6,700,804 | B1* | 3/2004 | Reichard | H02M 7/487 |
| | | | | 323/351 |
| 7,105,949 | B2* | 9/2006 | Wang | H02J 3/46 |
| | | | | 307/51 |
| 7,265,458 | B2* | 9/2007 | Edelen | H02J 9/06 |
| | | | | 307/65 |
| 7,486,099 | B1* | 2/2009 | Manika | G01R 31/42 |
| | | | | 324/762.08 |
| 7,906,871 | B2* | 3/2011 | Freeman | G06F 1/263 |
| | | | | 307/43 |
| 8,493,020 | B2* | 7/2013 | Lee | H01M 10/465 |
| | | | | 307/66 |
| 9,013,063 | B2* | 4/2015 | Sato | H02J 9/062 |
| | | | | 307/64 |
| 2002/0005643 | A1* | 1/2002 | Gilbreth | F01D 15/10 |
| | | | | 290/52 |
| 2003/0184160 | A1 | 10/2003 | Yamamoto | |
| 2004/0240244 | A1* | 12/2004 | Yamamoto | H02J 3/42 |
| | | | | 363/131 |
| 2005/0105306 | A1* | 5/2005 | Deng | H02M 5/4585 |
| | | | | 363/37 |
| 2005/0231171 | A1* | 10/2005 | Kato | H02M 5/4585 |
| | | | | 320/166 |
| 2005/0231172 | A1* | 10/2005 | Kato | B60L 11/1803 |
| | | | | 320/166 |
| 2007/0114852 | A1* | 5/2007 | Lin | H02J 1/10 |
| | | | | 307/66 |
| 2007/0210652 | A1* | 9/2007 | Tracy | H02J 9/062 |
| | | | | 307/66 |
| 2007/0273216 | A1* | 11/2007 | Farbarik | H02J 1/10 |
| | | | | 307/86 |
| 2009/0167089 | A1* | 7/2009 | Dishman | H02J 1/10 |
| | | | | 307/64 |
| 2010/0296204 | A1* | 11/2010 | Ichikawa | B60K 6/445 |
| | | | | 361/15 |
| 2011/0267857 | A1* | 11/2011 | Fornage | H02J 3/005 |
| | | | | 363/97 |
| 2011/0278930 | A1 | 11/2011 | Yasutomi et al. | |
| 2012/0013193 | A1* | 1/2012 | Sato | H02J 9/062 |
| | | | | 307/80 |
| 2012/0086269 | A1* | 4/2012 | Nakano | H02J 9/061 |
| | | | | 307/23 |
| 2012/0274229 | A1* | 11/2012 | Kumar | H05B 41/2806 |
| | | | | 315/248 |
| 2014/0197768 | A1* | 7/2014 | Haugen | H02J 4/00 |
| | | | | 318/442 |
| 2015/0003115 | A1* | 1/2015 | Barron | H02M 1/08 |
| | | | | 363/17 |
| 2016/0126858 | A1* | 5/2016 | Wu | H02M 1/36 |
| | | | | 363/89 |

FOREIGN PATENT DOCUMENTS

| | | | |
|---|---|---|---|
| JP | 50 150853 | | 12/1975 |
| JP | 2-311134 | A | 12/1990 |
| JP | 2002-58176 | | 2/2002 |
| JP | WO2011033820 | * | 3/2011 |
| JP | 2011 72068 | | 4/2011 |
| JP | WO2010119564 | * | 9/2011 |
| WO | WO 2010/058460 A1 | | 5/2010 |
| WO | 2011 033820 | | 3/2011 |

OTHER PUBLICATIONS

Combined Chinese Office Action and Search Report dated May 13, 2015 in Patent Application No. 201180071491.3 (with partial English language translation and English translation of categories of cited documents).

Office Action dated Sep. 30, 2014 in Japanese patent Application No. 2013-519311 (with English translation).

International Search Report dated Aug. 23, 2011 in PCT/JP11/063252 Filed Jun. 9, 2011.

U.S. Appl. No. 14/114,533, filed Oct. 29, 2013, Toyoda.

Office Action dated Nov. 3, 2017 in Chinese Patent Application No. 201180071491.3 (with English translation).

Chinese Office Action dated Aug. 17, 2016 for Chinese Application No. 201180071491.3, and English translation thereof.

Office Action dated Nov. 22, 2018 in Indian Patent Application No. 80/CHENP/2014, with English-language translation, 5 pages. (The references cited therein were previously filed.).

* cited by examiner

UNINTERRUPTIBLE POWER SUPPLY SYSTEM

TECHNICAL FIELD

The present invention relates to an uninterruptible power supply system including a plurality of uninterruptible power supply devices connected in parallel, each uninterruptible power supply device converting alternating current (AC) power into direct current (DC) power and inverting the converted DC power or DC power of a storage battery into AC power to supply the power to a load.

BACKGROUND ART

An uninterruptible power supply system disclosed in Japanese Patent Laying-Open No. 2011-72068 (Patent Document 1) includes a plurality of uninterruptible power supply devices, a switching circuit switching to a bypass power supply with outage in case of failure of each uninterruptible power supply device, and a switch opening/closing an output of the switching circuit. The uninterruptible power supply system disclosed in Patent Document 1 is configured such that connection between the switching circuit and a load can be selected by the switch to select a configuration in which one uninterruptible power supply device is connected, or a configuration in which the plurality of uninterruptible power supply devices are connected in parallel.

Thus, even when one of the uninterruptible power supply devices fails, the uninterruptible power supply system disclosed in Patent Document 1 can supply power in a short time, and thus can lower the risk of deactivation of the load due to an outage of the bypass power supply within a time required to repair the uninterruptible power supply device.

CITATION LIST

Patent Document

PTD 1: Japanese Patent Laying-Open No. 2011-72068

SUMMARY OF INVENTION

Technical Problem

Since improved reliability is required in conventional uninterruptible power supply systems, a plurality of uninterruptible power supply devices are connected in parallel, and operated in parallel by a common storage battery. Further, conventional uninterruptible power supply systems activate all of the uninterruptible power supply devices, irrespective of a power amount required for a load (actual power amount), if a total power amount of the uninterruptible power supply devices is smaller than a total rated power amount. Thus, conventional uninterruptible power supply systems have had a problem that efficiency of utilizing the plurality of uninterruptible power supply devices connected in parallel is poor.

Further, an uninterruptible power supply device includes a converter (conversion unit) converting AC power into DC power, and an inverter (inversion unit) inverting DC power into AC power, and as long as the uninterruptible power supply device is activated, power losses occur in semiconductor elements constituting the converter and the inverter. Thus, conventional uninterruptible power supply systems have had a problem that power consumption cannot be reduced due to power losses in uninterruptible power supply devices.

Furthermore, in conventional uninterruptible power supply systems, when any of the plurality of uninterruptible power supply devices connected in parallel is deactivated, all circuits including the converter and the inverter constituting the deactivated uninterruptible power supply device are deactivated. Thus, in conventional uninterruptible power supply systems, when the deactivated uninterruptible power supply device is reactivated to supply the power amount required for the load, it is necessary to activate all circuits in turn, which results in an increase in the time taken to activate the deactivated uninterruptible power supply device.

Accordingly, the present invention has been made to solve the aforementioned problems, and one object of the present invention is to provide an uninterruptible power supply system having a high efficiency of utilizing a plurality of uninterruptible power supply devices connected in parallel, and capable of reducing power consumption.

Solution to Problem

In order to solve the aforementioned problems, the present invention is directed to an uninterruptible power supply system, including: a plurality of uninterruptible power supply devices which are connected in parallel with respect to a load, and switch between power supplies supplying power to the load depending on states of the power supplies; a control unit controlling an operation of switching between the power supplies by the uninterruptible power supply devices; and a storage battery connected to the plurality of uninterruptible power supply devices in common. The uninterruptible power supply device has a conversion unit converting AC power of an AC power supply into DC power, a switching unit switching between the DC power converted by the conversion unit and DC power input from the storage battery, and an inversion unit inverting the DC power converted by the conversion unit or the DC power input from the storage battery into AC power and supplying the power to the load. The control unit deactivates the inversion unit which does not contribute to supplying a power amount required for the load, of a plurality of inversion units.

Advantageous Effects of Invention

According to the uninterruptible power supply system in accordance with the present invention, in the case where the power amount required for the load is smaller than a total rated power amount output by the activated uninterruptible power supply devices (inversion units) (i.e., in the case of a low load), the control unit deactivates the inversion unit which does not contribute to supplying the power amount required for the load, of the plurality of inversion units. Therefore, efficiency of utilizing the plurality of uninterruptible power supply devices connected in parallel can be enhanced. Further, since the inversion unit which does not contribute to supplying the power amount required for the load is deactivated in the uninterruptible power supply system in accordance with the present invention, power losses in the deactivated inversion unit are suppressed, and thus power consumption can be reduced. Furthermore, since only the inversion unit is deactivated in the uninterruptible power supply system in accordance with the present invention, the time taken to activate a deactivated uninterruptible power supply device can be shortened when compared with a case where all circuits in an uninterruptible power supply device are deactivated.

DESCRIPTION OF EMBODIMENTS

Hereinafter, embodiments in accordance with the present invention will be described with reference to the drawings.

Embodiment 1

Figure 1:
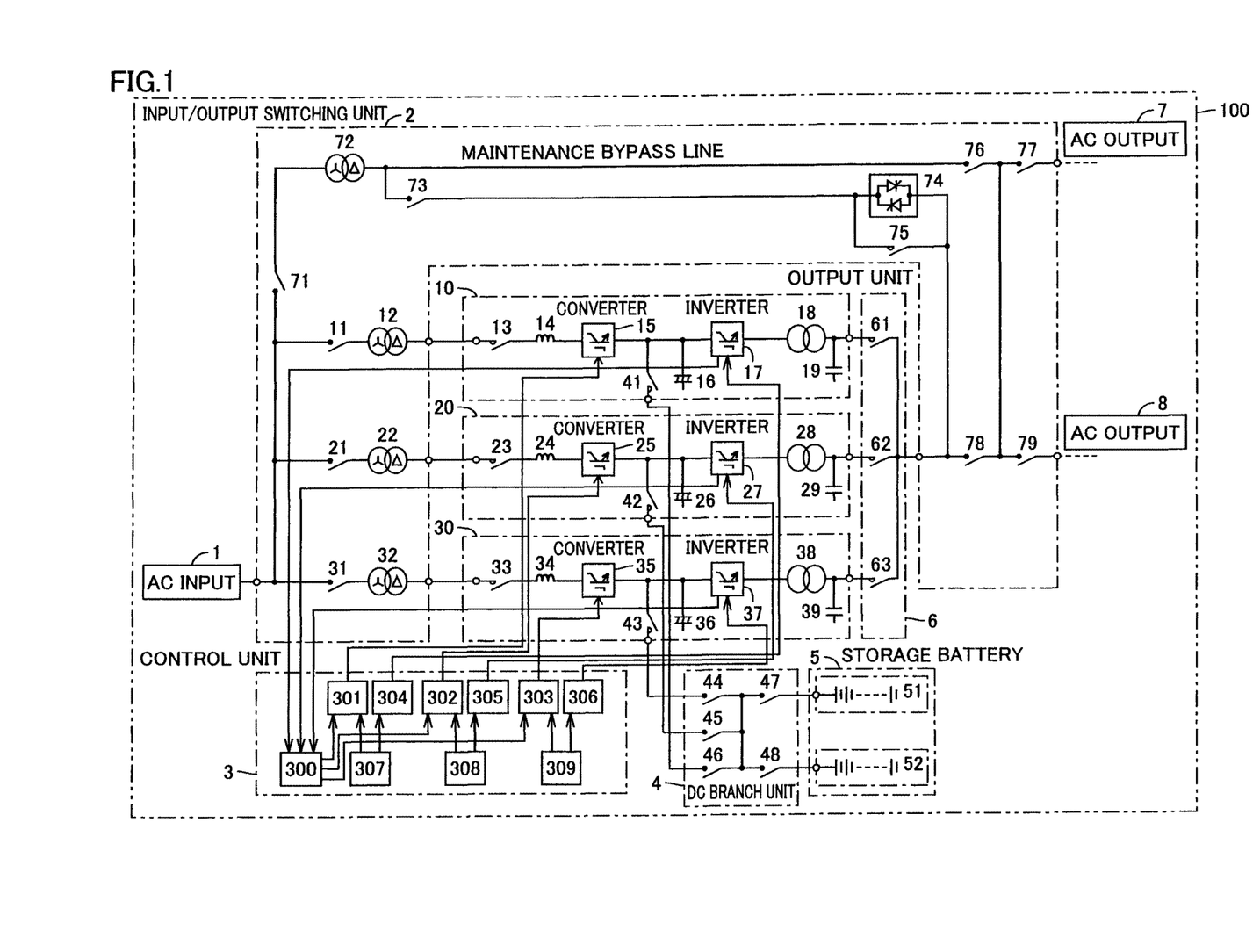
FIG. 1 is a schematic view showing a configuration of an uninterruptible power supply system in accordance with Embodiment 1 of the present invention.

FIG. 1 is a schematic view showing a configuration of an uninterruptible power supply system in accordance with Embodiment 1 of the present invention. An uninterruptible power supply system 100 shown in FIG. 1 includes an AC input unit 1, an input/output switching unit 2, a control unit 3, a DC branch unit 4, a storage battery 5, an output unit 6, AC output units 7, 8, and uninterruptible power supply devices 10, 20, 30.

AC input unit 1 is connected to an AC power supply not shown to supply power to uninterruptible power supply devices 10, 20, 30. The AC power supply connected to AC input unit 1 is an AC power supply such as a commercial power supply or a private power generator.

AC output units 7, 8 are connected to a load not shown (such as a computer or communication equipment) to supply power from uninterruptible power supply devices 10, 20, 30 to the load. If the power to be supplied from uninterruptible power supply devices 10, 20, 30 is, for example, three-phase AC power, AC output units 7, 8 are connected to the load using three-phase three-wire distribution lines.

Input/output switching unit 2 switches connections between AC input unit 1 and uninterruptible power supply devices 10, 20, 30 and connections between uninterruptible power supply devices 10, 20, 30 and AC output units 7, 8 to supply power to the load. It is noted that input/output switching unit 2 includes a maintenance bypass line connecting AC input unit 1 to AC output units 7, 8 when a maintenance work is performed on uninterruptible power supply devices 10, 20, 30. The maintenance bypass line includes a breaker 71, a transformer 72, a switch 73, a thyristor switch 74, and a contactor 75. Breaker 71 is a switch preventing high power from suddenly flowing into the maintenance bypass line. Transformer 72 is an insulation transformer transforming the AC voltage of AC input unit 1. Switch 73 is a switch connecting transformer 72 to thyristor switch 74. Thyristor switch 74 is a semiconductor switch capable of switching output power of uninterruptible power supply devices 10, 20, 30 faster than contactors 61 to 63 in output unit 6. Contactor 75 is a switch for outputting AC power of AC input unit 1 to AC output units 7, 8 through the maintenance bypass line.

Input/output switching unit 2 includes a breaker 11 for preventing a sudden inflow of high power, between AC input unit 1 and uninterruptible power supply device 10. Similarly, input/output switching unit 2 includes a breaker 21 between AC input unit 1 and uninterruptible power supply device 20, and includes a breaker 31 between AC input unit 1 and uninterruptible power supply device 30.

Input/output switching unit 2 further includes a transformer 12 transforming the AC voltage of AC input unit 1, between AC input unit 1 and uninterruptible power supply device 10. Similarly, input/output switching unit 2 includes a transformer 22 between AC input unit 1 and uninterruptible power supply device 20, and includes a transformer 32 between AC input unit 1 and uninterruptible power supply device 30.

Furthermore, input/output switching unit 2 includes a switch 76 connecting the maintenance bypass line to AC output units 7, 8, and switches 77 to 79 connecting uninterruptible power supply devices 10, 20, 30 to AC output units 7, 8.

Uninterruptible power supply device 10 includes a contactor 13, an AC reactor 14, a converter 15, an electrolytic capacitor 16, an inverter 17, a transformer 18, and a capacitor 19. Contactor 13 is a switch for inputting the AC power having the voltage transformed by transformer 12 to uninterruptible power supply device 10. AC reactor 14 is a filter for shaping the waveform of the AC power input to uninterruptible power supply device 10. Converter 15 is a conversion unit converting the AC power having the waveform shaped by AC reactor 14 into DC power.

Electrolytic capacitor 16 is a smoothing capacitor for smoothing the DC power converted by converter 15. Inverter 17 is an inversion unit inverting the DC power smoothed by electrolytic capacitor 16 or DC power input from storage battery 5 into AC power.

Figure 2:
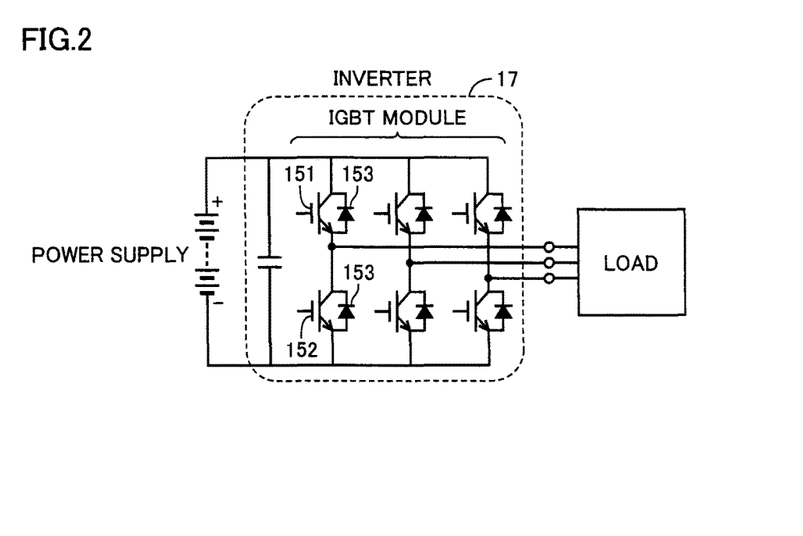
FIG. 2 is a circuit diagram showing a configuration of an inverter of the uninterruptible power supply system in accordance with Embodiment 1 of the present invention.

FIG. 2 is a circuit diagram showing a configuration of inverter 17 of uninterruptible power supply system 100 in accordance with Embodiment 1 of the present invention. Inverter 17 shown in FIG. 2 includes three IGBTs (Insulated Gate Bipolar Transistors) 151 connected in parallel between a positive side of a power supply and a load, three IGBTs 152 connected in parallel between a negative side of the power supply and the load, and FWDs (Free Wheeling Diodes) 153 connected in parallel with IGBTs 151, 152.

Inverter 17 can invert DC power into AC power by driving each IGBT 151, 152 at an appropriate time. Losses caused by driving IGBT 151, 152 include a steady loss caused by passing a current through IGBT 151, 152, and a switching loss caused by switching IGBT 151, 152.

Figure 3:
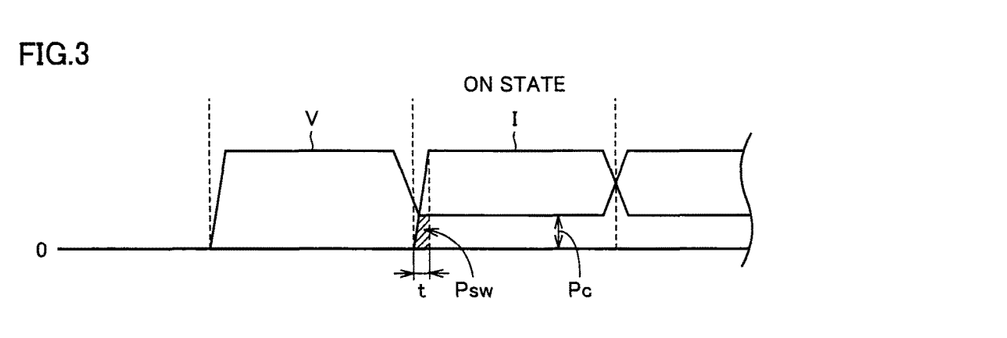
FIG. 3 is a timing chart for illustrating a switching loss in an IGBT.

FIG. 3 is a timing chart for illustrating a switching loss in IGBT 151, 152. The waveforms shown in FIG. 3 indicate a waveform of a voltage V applied to a gate electrode of IGBT 151, 152, and a waveform of a current I flowing between a collector electrode and an emitter electrode of IGBT 151, 152. IGBT 151, 152 enters an ON state at the time when voltage V applied to the gate electrode falls, and current I starts flowing between the collector electrode and the emitter electrode. If a time taken from when voltage V applied to the gate electrode falls to when current I flowing between the collector electrode and the emitter electrode enters a steady state is referred to as a switching time t, a switching loss $P_{sw}$ in IGBT 151, 152 is calculated by multiplying switching time t by power (voltage V×current I) consumed in IGBT 151, 152, i.e., switching loss $P_{sw}$=voltage V×current I×switching time t. Accordingly, in the case where a power amount required for the load is smaller than a total rated power amount output by a plurality of activated inverters (i.e., in the case of a low load), even if there is an inverter which does not contribute to supplying the power amount required for the load, switching loss $P_{sw}$ is caused every time when the IGBT is switched, unless the inverter is deactivated.

Since inverter 17 uses IGBTs 151, 152, it has a fast switching time t of 0.25 μm. However, inverter 17 is not limited to use IGBTs 151, 152 as long as it uses semiconductor switches, and may use bipolar transistors, thyristors, or the like. When inverter 17 uses bipolar transistors, it has switching time t of 2.5 μm, which is slower than that when it uses the IGBTs.

Further, the reason why the waveform of voltage V shown in FIG. 3 does not become 0 V even when it falls is because a steady loss $P_c$ is caused in IGBT 151, 152. Accordingly, in the case where the power amount required for the load is smaller than the total rated power amount output by the plurality of activated inverters (i.e., in the case of a low load), even if there is an inverter which does not contribute to supplying the power amount required for the load, steady loss $P_c$ is caused in the IGBT unless the inverter is deactivated.

Thus, in uninterruptible power supply system 100 in accordance with Embodiment 1 of the present invention, in the case where the power amount required for the load is small (i.e., in the case of a low load), the inverter which does not contribute to supplying the power amount required for the load is deactivated, and thereby switching loss $P_{sw}$ and steady loss $P_c$ are suppressed and power consumption is reduced, as described later.

It is noted that converter 15 and inverter 17 have the same circuit configuration, since they are merely different in that the former converts AC power into DC power and the latter inverts DC power into AC power. Thus, converter 15 also has a configuration including three IGBTs 151 connected in parallel between a positive side of a power supply and a load, three IGBTs 152 connected in parallel between a negative side of the power supply and the load, and FWDs 153 connected in parallel with IGBTs 151, 152, as shown in FIG. 2.

Referring back to FIG. 1, transformer 18 transforms the voltage of the AC power inverted by inverter 17. Capacitor 19 is a filter for shaping the waveform of the AC power having the voltage transformed by transformer 18. The AC power having the waveform shaped by capacitor 19 is output from uninterruptible power supply device 10. The AC power output from uninterruptible power supply device 10 is output from AC output units 7, 8, via contactor 61 of output unit 6.

Output unit 6 includes contactors 61 to 63. Output unit 6 switches contactors 61 to 63 to connect uninterruptible power supply devices 10, 20, 30 to AC output units 7, 8 and supply the AC power output from uninterruptible power supply devices 10, 20, 30 to the load.

Uninterruptible power supply device 20 includes a contactor 23, an AC reactor 24, a converter 25, an electrolytic capacitor 26, an inverter 27, a transformer 28, and a capacitor 29. Uninterruptible power supply device 30 includes a contactor 33, an AC reactor 34, a converter 35, an electrolytic capacitor 36, an inverter 37, a transformer 38, and a capacitor 39. Since the configurations of uninterruptible power supply devices 20, 30 are the same as that of uninterruptible power supply device 10, a detailed description thereof will not be repeated.

Control unit 3 includes an inverter control unit 300, converter operation command circuits 301 to 303, inverter operation command circuits 304 to 306, and signal generation circuits 307 to 309. It is noted that control unit 3 also controls an operation of switching between power supplies (the AC power supply connected to AC input unit 1 and the DC power supply of the storage battery) for uninterruptible power supply devices 10, 20, 30.

Inverter control unit 300 receives a feedback value of an inverter load current from each inverter 17, 27, 37 and adds the received feedback value to calculate a total power amount output by inverters 17, 27, 37 for supplying a power amount required for the load. Further, inverter control unit 300 compares the calculated total power amount with a total rated power amount output, when at least one of activated inverters 17, 27, 37 is deactivated, by the remaining inverters, and outputs signals for commanding to select the number of inverters 17, 27, 37 to inverter operation command circuits 304 to 306 for inverters 17, 27, 37.

Signal generation circuits 307 to 309 receive instructions to activate and deactivate converters 15, 25, 35 and inverters 17, 27, 37 from an input unit not shown, and output instruction signals to converter operation command circuits 301 to 303 and inverter operation command circuits 304 to 306.

Converter operation command circuits 301 to 303 output command signals for commanding activation and deactivation to converters 15, 25, 35, based on the instruction signals output by signal generation circuits 307 to 309.

Inverter operation command circuits 304 to 306 output command signals for commanding activation and deactivation to inverters 17, 27, 37, based on the number selection command signals output by inverter control unit 300 and the instruction signals output by signal generation circuits 307 to 309.

DC branch unit 4 includes breakers 44 to 48. Breakers 44, 45, 46 are switches preventing high power from suddenly flowing into uninterruptible power supply devices 10, 20, 30. Breakers 47, 48 are switches preventing high power from suddenly flowing into storage battery 5. It is noted that uninterruptible power supply devices 10, 20, 30 include contactors 41, 42, 43. Contactors 41, 42, 43 are switches for connecting uninterruptible power supply devices 10, 20, 30 to storage battery 5, and are switching units switching between the DC power converted by converters 15, 25, 35 and the DC power input from storage battery 5.

Storage battery 5 is connected to uninterruptible power supply devices 10, 20, 30 in common. Storage battery 5 is composed of two batteries 51, 52. It is noted that storage battery 5 is not limited to be composed of two batteries 51, 52, and may be composed of a single battery or three or more batteries.

Figure 4:
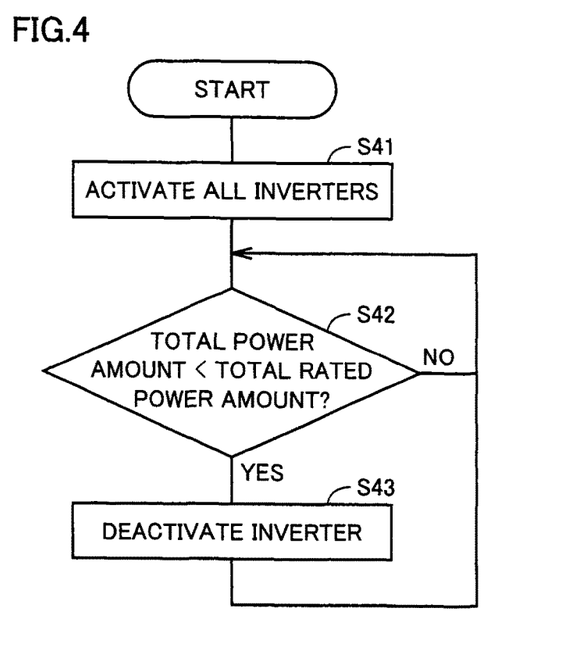
FIG. 4 is a flowchart for illustrating an operation of the uninterruptible power supply system in accordance with Embodiment 1 of the present invention.

Next, an operation of uninterruptible power supply system 100 in accordance with Embodiment 1 of the present invention will be described. FIG. 4 is a flowchart for illustrating the operation of uninterruptible power supply system 100 in accordance with Embodiment 1 of the present invention. First, inverter control unit 300 activates inverters 17, 27, 37 of all uninterruptible power supply devices 10, 20, 30 (step S41). Specifically, inverter control unit 300 outputs number selection command signals for selecting all inverters 17, 27, 37 to inverter operation command circuits 304 to 306 for inverters 17, 27, 37, and signal generation circuits 307 to 309 output instruction signals for activating inverters 17, 27, 37 to inverter operation command circuits 304 to 306.

Inverter operation command circuits 304 to 306 output command signals for commanding activation to inverters 17, 27, 37, based on the number selection command signals output by inverter control unit 300 and the instruction signals output by signal generation circuits 307 to 309. Inverters 17, 27, 37 are activated based on the command signals output by inverter operation command circuits 304 to 306.

Subsequently, inverter control unit 300 compares the total power amount output by inverters 17, 27, 37 for supplying the power amount required for the load, with the total rated power amount output, when at least one of activated inverters 17, 27, 37 is deactivated, by the remaining inverters, and determines whether or not the total power amount is smaller than the total rated power amount (step S42).

When inverter control unit 300 determines that the total power amount is smaller than the total rated power amount (YES in step S42), inverter control unit 300 deactivates at least one of activated inverters 17, 27, 37 (step S43). For example, when a rated power amount output by each inverter 17, 27, 37 is 1 kWh, inverter control unit 300 determines that, if the total power amount is 1.8 kWh, it is smaller than a total rated power amount output, when one of activated inverters 17, 27, 37 is deactivated, by the remaining inverters (1 kWh×2 units=2 kWh).

That is, if the total power amount is 1.8 kWh, even when inverter control unit 300 deactivates one inverter 37, the total power amount is smaller than the total rated power amount output by activated inverters 17, 27 (1 kWh×2 units=2 kWh). Thus, inverter control unit 300 deactivates inverter 37 by outputting a number selection command signal "OFF" to inverter operation command circuit 306 for inverter 37.

When inverter control unit 300 determines that the total power amount is not less than the total rated power amount (NO in step S42), inverter control unit 300 returns the processing to step S42 to monitor a change in the total power amount. Further, after inverter control unit 300 deactivates at least one of activated inverters 17, 27, 37 (step S43), inverter control unit 300 returns the processing to step S42 to monitor a change in the total power amount.

It is noted that inverter control unit 300 may deactivate one of inverters 17, 27, 37, or two or more of inverters 17, 27, 37. When inverter control unit 300 deactivates one of inverters 17, 27, 37, inverter control unit 300 compares the total power amount with the total rated power amount output, when one of activated inverters 17, 27, 37 is deactivated, by the remaining inverters. When inverter control unit 300 deactivates two of inverters 17, 27, 37, inverter control unit 300 compares the total power amount with a total rated power amount output, when two of activated inverters 17, 27, 37 are deactivated, by the remaining inverter.

As described above, according to uninterruptible power supply system 100 in accordance with Embodiment 1 of the present invention, in the case where the power amount required for the load is smaller than a total rated power amount output by activated inverters 17, 27, 37 (i.e., in the case of a low load), inverter control unit 300 deactivates the inverter which does not contribute to supplying the power amount required for the load, of inverters 17, 27, 37. Therefore, efficiency of utilizing the plurality of uninterruptible power supply devices 10, 20, 30 connected in parallel can be enhanced. Further, since inverter 17, 27, 37 which does not contribute to supplying the power amount required for the load is deactivated in uninterruptible power supply system 100 in accordance with Embodiment 1 of the present invention, switching loss $P_{sw}$ and steady loss $P_c$ in the deactivated inverter are suppressed, and thus power consumption can be reduced. Furthermore, since only inverter 17, 27, 37 is deactivated in uninterruptible power supply system 100 in accordance with Embodiment 1 of the present invention, the time taken to activate deactivated uninterruptible power supply device 10, 20, 30 can be shortened when compared with a case where all circuits in uninterruptible power supply device 10, 20, 30 are deactivated. In addition, since the state where all converters 15, 25, 35 are activated is maintained in uninterruptible power supply system 100 in accordance with Embodiment 1 of the present invention, an overload operation of uninterruptible power supply devices 10, 20, 30 can be avoided.

For example, when the total power amount is not less than one third and less than two thirds of the total rated power amount output by all inverters 17, 27, 37, inverter control unit 300 deactivates inverter 37 by outputting a number selection command signal "ON" to each of inverter operation command circuits 304, 305 for inverters 17, 27 and outputting a number selection command signal "OFF" to inverter operation command circuit 306 for inverter 37. In addition, when the total power amount is less than one third of the total rated power amount output by all inverters 17, 27, 37, inverter control unit 300 deactivates inverters 27, 37 by outputting a number selection command signal "ON" to inverter operation command circuit 304 for inverter 17 and outputting a number selection command signal "OFF" to each of inverter operation command circuits 305, 306 for inverters 27, 37.

It is noted that, when the total power amount becomes larger than the total rated power amount output by activated inverters 17, 27, 37 due to an increase in the load, inverter control unit 300 can stably supply power to the load by activating the deactivated inverter.

Embodiment 2

An uninterruptible power supply system in accordance with Embodiment 2 of the present invention includes AC input unit 1, input/output switching unit 2, control unit 3, DC branch unit 4, storage battery 5, output unit 6, AC output units 7, 8, and uninterruptible power supply device 10, 20, 30, as with uninterruptible power supply system 100 in accordance with Embodiment 1. Thus, concerning the uninterruptible power supply system in accordance with Embodiment 2 of the present invention, components identical to those of uninterruptible power supply system 100 in accordance with Embodiment 1 will be designated by the same reference numerals, and a detailed description thereof will not be repeated.

Figure 5:
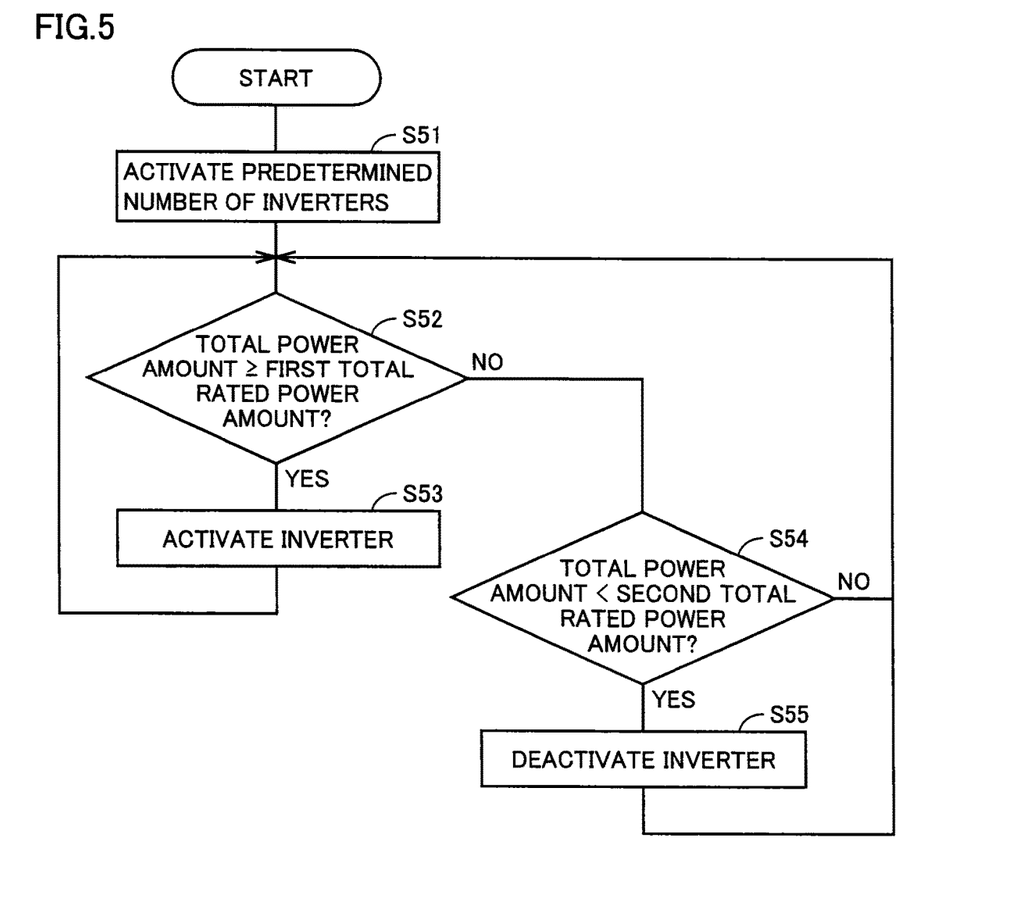
FIG. 5 is a flowchart for illustrating an operation of an uninterruptible power supply system in accordance with Embodiment 2 of the present invention.

Next, an operation of the uninterruptible power supply system in accordance with Embodiment 2 of the present invention will be described. FIG. 5 is a flowchart for illustrating the operation of the uninterruptible power supply system in accordance with Embodiment 2 of the present invention. First, inverter control unit 300 activates a predetermined number of inverters 17, 27, 37 of uninterruptible power supply devices 10, 20, 30 (step S51). Inverter control unit 300 sets the predetermined number of inverters to be activated to half of the number of inverters of the uninterruptible power supply devices. For example, when the number of inverters of the uninterruptible power supply devices is four, inverter control unit 300 sets the predetermined number of inverters to be activated to two. It is noted that, when the number of inverters of the uninterruptible power supply devices is an odd number, inverter control unit 300 sets a number calculated by rounding up the predetermined number of inverters to be activated, as a predetermined number.

Specifically, when the number of inverters 17, 27, 37 of uninterruptible power supply devices 10, 20, 30 is three, inverter control unit 300 outputs number selection command signals for selecting two inverters 17, 27 to inverter operation command circuits 304, 305 for inverters 17, 27, and signal generation circuits 307, 308 output instruction signals for activating inverters 17, 27 to inverter operation command circuits 304, 305.

Inverter operation command circuits 304, 305 output command signals for commanding activation to inverters 17, 27, based on the number selection command signals output by inverter control unit 300 and the instruction signals output by signal generation circuits 307, 308. Inverters 17, 27 are activated based on the command signals output by inverter operation command circuits 304, 305.

Subsequently, inverter control unit 300 compares a total power amount output by inverters 17, 27 for supplying a power amount required for the load, with a first total rated power amount output by activated inverters 17, 27, and determines whether or not the total power amount is not less than the first total rated power amount (step S52).

When inverter control unit 300 determines that the total power amount is not less than the first total rated power amount (YES in step S52), inverter control unit 300 activates deactivated inverter 37 (step S53). For example, when the rated power amount output by each inverter 17, 27, 37 is 1 kWh, inverter control unit 300 determines that, if the total power amount is 2.8 kWh, it is not less than the total rated power amount output by activated inverters 17, 27 (1 kWh×2 units=2 kWh).

By inverter control unit 300 activating inverter 37, the total power amount (2.8 kWh) can be smaller than the total rated power amount output by inverters 17, 27, 37 (1 kWh×3 units=3 kWh), and thus an overload operation can be avoided. Inverter control unit 300 activates inverter 37 by outputting a number selection command signal "ON" to inverter operation command circuit 306 for inverter 37.

It is noted that, after inverter control unit 300 activates deactivated inverter 37 (step. S53), inverter control unit 300 returns the processing to step S52 to monitor a change in the total power amount.

When inverter control unit 300 determines that the total power amount is smaller than the first total rated power amount (NO in step S52), inverter control unit 300 compares the total power amount with a second total rated power amount output, when at least one of activated inverters 17, 27 is deactivated, by the remaining inverter, and determines whether or not the total power amount is smaller than the second total rated power amount (step S54).

When inverter control unit 300 determines that the total power amount is smaller than the second total rated power amount (YES in step S54), inverter control unit 300 deactivates at least one of activated inverters 17, 27 (step S55). For example, when the rated power amount of each inverter 17, 27, 37 is 1 kWh, inverter control unit 300 determines that, if the total power amount is 0.8 kWh, it is smaller than the total rated power amount output, when at least one of activated inverters 17, 27 is deactivated, by the remaining inverter (1 kWh×1 unit=1 kWh).

That is, if the total power amount is 0.8 kWh, even when inverter control unit 300 deactivates one inverter 27, the total power amount is smaller than the total rated power amount output by activated inverter 17 (1 kWh×1 unit=1 kWh). Thus, inverter control unit 300 deactivates inverter 27 by outputting a number selection command signal "OFF" to inverter operation command circuit 305 for inverter 27.

When inverter control unit 300 determines that the total power amount is not less than the second total rated power amount (NO in step S54), inverter control unit 300 returns the processing to step S52 to monitor a change in the total power amount. Further, after inverter control unit 300 deactivates at least one of activated inverters 17, 27 (step S55), inverter control unit 300 returns the processing to step S52 to monitor a change in the total power amount.

It is noted that, when two inverters 17, 27 are activated as described above, inverter control unit 300 deactivates one of activated inverters 17, 27, and when three or more inverters are activated, inverter control unit 300 may deactivate at least one of the activated inverters.

As described above, according to the uninterruptible power supply system in accordance with Embodiment 2 of the present invention, in the case where the power amount required for the load is smaller than the total rated power amount output by activated inverters 17, 27 (i.e., in the case of a low load), inverter control unit 300 deactivates at least one of activated inverters 17, 27. Therefore, efficiency of utilizing the plurality of uninterruptible power supply devices 10, 20, 30 connected in parallel can be enhanced. Further, in the uninterruptible power supply system in accordance with Embodiment 2 of the present invention, in the case where the power amount required for the load is larger than the total rated power amount output by activated inverters 17, 27 (i.e., in the case of an overload), deactivated inverter 37 is activated. Therefore, an overload operation can be avoided, and lives of uninterruptible power supply devices 10, 20, 30, storage battery 5, and the like can be increased.

Embodiment 3

An uninterruptible power supply system in accordance with Embodiment 3 of the present invention includes AC input unit 1, input/output switching unit 2, control unit 3, DC branch unit 4, storage battery 5, output unit 6, AC output units 7, 8, and uninterruptible power supply device 10, 20, 30, as with uninterruptible power supply system 100 in accordance with Embodiment 1. Thus, concerning the uninterruptible power supply system in accordance with Embodiment 3 of the present invention, components identical to those of uninterruptible power supply system 100 in accordance with Embodiment 1 will be designated by the same reference numerals, and a detailed description thereof will not be repeated.

Figure 6:
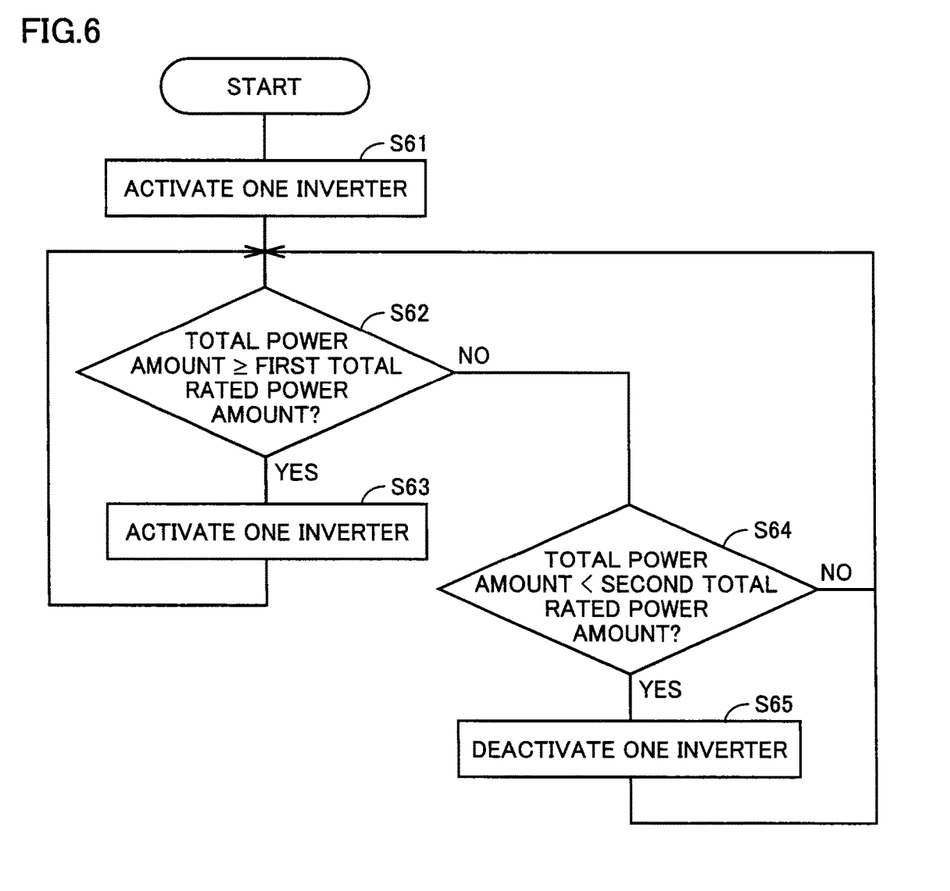
FIG. 6 is a flowchart for illustrating an operation of an uninterruptible power supply system in accordance with Embodiment 3 of the present invention.

Next, an operation of the uninterruptible power supply system in accordance with Embodiment 3 of the present invention will be described. FIG. 6 is a flowchart for illustrating the operation of the uninterruptible power supply system in accordance with Embodiment 3 of the present invention. First, inverter control unit 300 activates one of inverters 17, 27, 37 of uninterruptible power supply devices 10, 20, 30 (step S61).

Specifically, when the number of inverters 17, 27, 37 of uninterruptible power supply devices 10, 20, 30 is three, inverter control unit 300 outputs a number selection command signal for selecting one inverter 17 to inverter operation command circuit 304 for inverter 17, and signal generation circuit 307 outputs an instruction signal for activating inverter 17 to inverter operation command circuit 304.

Inverter operation command circuit 304 outputs a command signal for commanding activation to inverter 17, based on the number selection command signal output by inverter control unit 300 and the instruction signal output by signal generation circuit 307. Inverter 17 is activated based on the command signal output by inverter operation command circuit 301.

Subsequently, inverter control unit 300 compares a total power amount output by inverter 17 for supplying a power amount required for the load, with a first total rated power amount output by activated inverter 17, and determines whether or not the total power amount is not less than the first total rated power amount (step S62).

When inverter control unit 300 determines that the total power amount is not less than the first total rated power amount (YES in step S62), inverter control unit 300 activates one inverter 27 of deactivated inverters 27, 37 (step S63). For example, when the rated power amount output by each inverter 17, 27, 37 is 1 kWh, inverter control unit 300 determines that, if the total power amount is 1.8 kWh, it is not less than the total rated power amount output by activated inverter 17 (1 kWh×1 unit=1 kWh).

By inverter control unit 300 activating inverter 27, the total power amount (1.8 kWh) can be smaller than the total rated power amount output by inverters 17, 27 (1 kWh×2 units=2 kWh), and thus an overload operation can be avoided. Inverter control unit 300 activates inverter 27 by outputting a number selection command signal "ON" to inverter operation command circuit 305 for inverter 27.

It is noted that, after inverter control unit 300 activates deactivated inverter 27 (step S63), inverter control unit 300 returns the processing to step S62 to monitor a change in the total power amount.

When inverter control unit 300 determines that the total power amount is smaller than the first total rated power amount (NO in step S62), inverter control unit 300 compares the total power amount with a second total rated power amount output, when one of the activated inverters is deactivated, by the remaining inverter, and determines whether or not the total power amount is smaller than the second total rated power amount (step S64). It is noted that the processing in step S64 is performed only when two or more inverters are activated. Thus, the processing in step S64 is skipped when one inverter is activated. Hereinafter, a description will be given of a case where two inverters 17, 27 are activated.

When inverter control unit 300 determines that the total power amount is smaller than the second total rated power amount (YES in step S64), inverter control unit 300 deactivates one of activated inverters 17, 27 (step S65). For example, when the rated power amount of each inverter 17, 27, 37 is 1 kWh, inverter control unit 300 determines that, if the total power amount is 0.8 kWh, it is smaller than the total rated power amount output, when one of activated inverters 17, 27 is deactivated, by the remaining inverter (1 kWh×1 unit=1 kWh).

That is, if the total power amount is 0.8 kWh, even when inverter control unit 300 deactivates one inverter 27, the total power amount is smaller than the total rated power amount output by activated inverter 17 (1 kWh×1 unit=1 kWh). Thus, inverter control unit 300 deactivates inverter 27 by outputting a number selection command signal "OFF" to inverter operation command circuit 305 for inverter 27.

When inverter control unit 300 determines that the total power amount is not less than the second total rated power amount (NO in step S64), inverter control unit 300 returns the processing to step S62 to monitor a change in the total power amount. Further, after inverter control unit 300 deactivates one of activated inverters 17, 27 (step S65), inverter control unit 300 returns the processing to step S62 to monitor a change in the total power amount.

As described above, according to the uninterruptible power supply system in accordance with Embodiment 3 of the present invention, in the case where the power amount required for the load is smaller than the total rated power amount output by activated inverters 17, 27 (i.e., in the case of a low load), inverter control unit 300 deactivates one of activated inverters 17, 27. Therefore, efficiency of utilizing the plurality of uninterruptible power supply devices 10, 20, 30 connected in parallel can be enhanced. Further, in the uninterruptible power supply system in accordance with Embodiment 3 of the present invention, in the case where the power amount required for the load is larger than the total rated power amount output by activated inverter 17 (i.e., in the case of an overload), one of deactivated inverters 27, 37 is activated. Therefore, an overload operation can be avoided, and lives of uninterruptible power supply devices 10, 20, 30, storage battery 5, and the like can be increased.

It is noted that, since the inverters are activated or deactivated one by one in the uninterruptible power supply system in accordance with Embodiment 3 of the present invention, inverters 17, 27, 37 (uninterruptible power supply devices 10, 20, 30) are not activated wastefully, and thus power consumption can be further reduced.

It should be understood that the embodiments disclosed herein are illustrative and non-restrictive in every respect. The scope of the present invention is defined by the scope of the claims, rather than the description above, and is intended to include any modifications within the scope and meaning equivalent to the scope of the claims.

REFERENCE SIGNS LIST

1: AC input unit; 2: switching unit; 3: control unit; 4: DC branch unit; 5: storage battery; 6: output unit; 7, 8: AC output unit; 10, 20, 30: uninterruptible power supply device; 11, 21, 31, 44 to 48, 71: breaker; 12, 18, 22, 28, 32, 38, 72: transformer; 13, 23, 33, 41 to 43, 61 to 63, 75: contactor; 14, 24, 34: AC reactor; 15, 25, 35: converter; 16, 26, 36: electrolytic capacitor; 17, 27, 37: inverter; 19, 29, 39: capacitor; 51, 52: battery; 73, 76 to 79: switch; 74: thyristor switch; 100: uninterruptible power supply system; 300: inverter control unit; 301 to 303: converter operation command circuit; 304 to 306: inverter operation command circuit; 307 to 309: signal generation circuit.

The invention claimed is:

1. An uninterruptible power supply system, comprising:
a plurality of uninterruptible power supply devices which are connected in parallel with respect to a load, and switch between power supplies supplying power to said load depending on states of said power supplies;
a control circuit controlling an operation of switching between said power supplies by the plurality of said uninterruptible power supply devices; and
a storage battery connected to the plurality of said uninterruptible power supply devices in common,
at least one of the plurality of said uninterruptible power supply devices including
a conversion circuit to convert a first AC power of an AC power supply into a first DC power,
a switching circuit connected to the conversion circuit and the storage battery and configured to switch between the first DC power and a second DC power input from said storage battery, and
an inversion circuit having a same configuration as the conversion circuit and being configured to invert the first DC power or the second DC power, based on a setting of the switching circuit, into second AC power and to supply the second AC power to said load, and in the case where a total power amount required for said load is smaller than a total power output by a plurality of inversion circuits of the plurality of said uninterruptible power supply devices, said control circuit deactivates an uninterruptible power supply device that does not contribute to a power amount required by the load by deactivating an inversion circuit of the uninterruptible power supply device while maintaining a conversion circuit and a switching circuit of the uninterruptible power supply device active.

2. The uninterruptible power supply system according to claim 1, wherein
said control circuit activates all of the plurality of said inversion circuits,
said control circuit determines said total power amount required for said load,
said control circuit compares said total power amount required for said load with a total rated power amount output by the plurality of said activated inversion circuits, and
when said total power amount is smaller than said total rated power amount, said control circuit deactivates at least one of the plurality of said activated inversion circuits.

3. The uninterruptible power supply system according to claim 1, wherein
said control circuit activates a predetermined number of the plurality of said inversion circuits, the predetermined number being not less than two, and a rest of the plurality of said inversion circuits being kept deactivated,
said control circuit determines said total power amount required for said load,
said control circuit compares said total power amount required for said load with a first total rated power amount output by the predetermined number of the plurality of said activated inversion circuits,
when said total power amount is not less than said first total rated power amount, said control circuit activates said rest of the plurality of said inversion circuits being kept deactivated one by one until said total power amount becomes smaller than said first total rated power amount,
when said total power amount is smaller than said first total rated power amount, said control circuit compares said total power amount with a second total rated power amount output, when at least one of the plurality of said activated inversion circuits is deactivated, by currently activated inversion circuits, and when said total power amount is smaller than said second total rated power amount, said control circuit deactivates at least one of the plurality of said currently activated inversion circuits.

4. The uninterruptible power supply system according to claim 3, wherein said control circuit sets said predetermined number of the plurality of said inversion circuits to be activated to half of a total number of the plurality of said inversion circuits of the plurality of said uninterruptible power supply devices.

5. The uninterruptible power supply system according to claim 1, wherein
said control circuit activates one of the plurality of said inversion circuits, a rest of the plurality of said inversion circuits being kept deactivated,
said control circuit determines said total power amount required for said load,
said control circuit compares said total power amount required for said load with a first total rated power amount output by said activated inversion circuit,
when said total power amount is not less than said first total rated power amount, said control circuit activates said rest of the plurality of said inversion circuits being kept deactivated one by one until said total power amount becomes smaller than said first total rated power amount,
when said total power amount is smaller than said first total rated power amount, said control circuit compares said total power amount with a second total rated power amount output, when one of the plurality of said activated inversion circuits is deactivated, by currently activated inversion circuits, and
when said total power amount is smaller than said second total rated power amount, said control circuit deactivates one of the plurality of said currently activated inversion circuits.

6. The uninterruptible power supply system according to claim 1, wherein when said control circuit deactivates the gate signal applied to the gate electrode of the semiconductor device of the one of the plurality of said inversion circuits that does not contribute to supplying the power amount required for said load, a conversion circuit included in a corresponding uninterruptible power supply device of the deactivated one of the plurality of said inversion circuits is kept activated to shorten a time taken to activate the uninterruptible power supply device including the deactivated one of the plurality of said inversion circuits.

7. The uninterruptible power supply system according to claim 1, wherein said control circuit receives a feedback value of an inverter load current from each of the plurality of said inversion circuits to calculate the total power output by the plurality of said inversion circuits.

* * * * *